June 23, 1964 G. W. RUNDLE 3,138,365
WEED PULLER
Filed Dec. 17, 1962
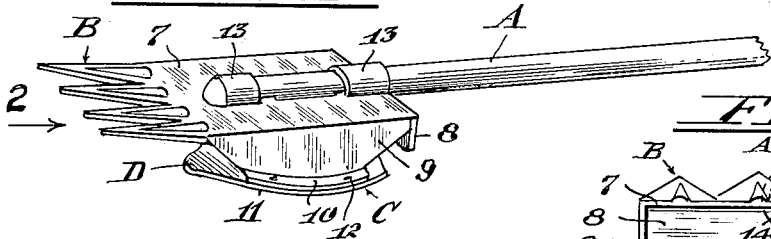
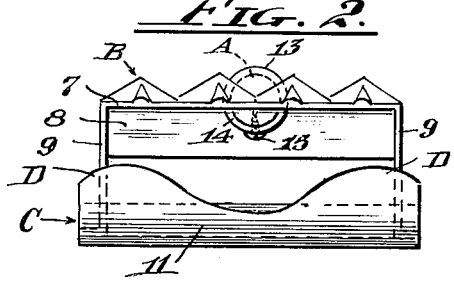
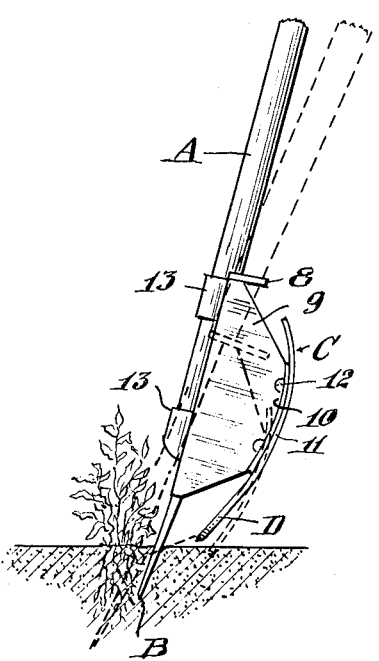
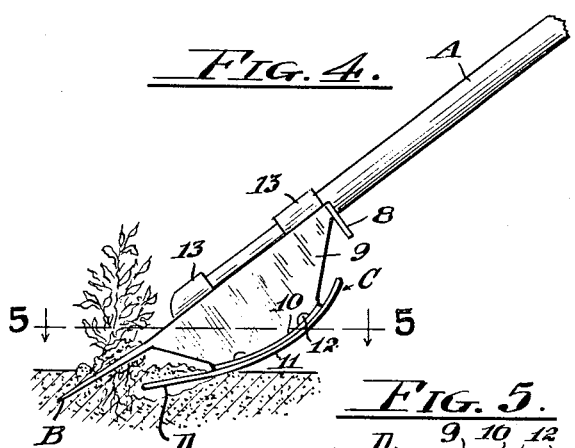
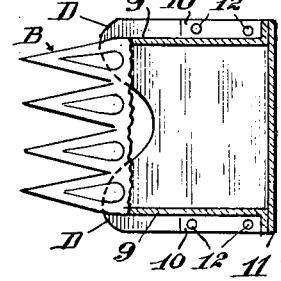
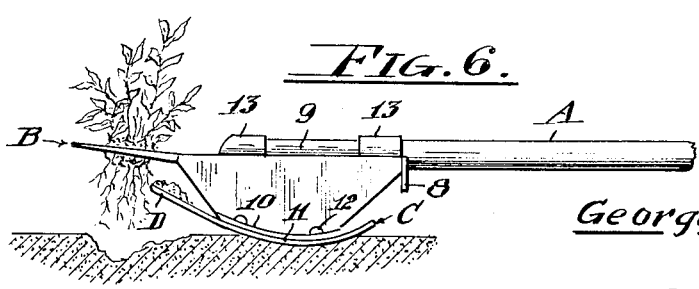
INVENTOR
George W. Rundle
BY
R. S. Berry
ATTORNEY

United States Patent Office 3,138,365
Patented June 23, 1964

3,138,365
WEED PULLER
George W. Rundle, 14603 S. Vermont Ave.,
Gardena, Calif.
Filed Dec. 17, 1962, Ser. No. 245,285
1 Claim. (Cl. 254—132)

This invention relates to a weed puller and has as its primary object the provision of an implement which is adapted to be disposed in forked engagement with the imbedded roots of a plant and then manipulated to exert a leverage on the plant such as to effect its extraction from the soil.

A particular object of the invention is to provide a weed puller which embodies tines adapted to be thrust into the ground and engage with the roots of a plant and also embodies a rocker which together with the tines is mounted on a handle so as to serve as a fulcrum whereby the handle may be manipulated as a lever to pry the roots free of the ground, and wherein the parts are so constructed as to be readily and economically produced and assembled.

Another object is to provide a weed pulling implement of the above character in which the rocker is mounted in spaced relation to the tines and embodies a marginal blade presented edgewise toward the tips of the tines in spaced relation thereto, whereby, on impressing the tines longitudinally downward into the soil, the marginal blade portion of the rocker may be readily caused to penetrate the soil adjacent the base of a weed being extracted so that on manipulation of the implement to extract the weed the blade will loosen the soil contiguous the weed thereby facilitating its being pulled free of the soil on tilting the implement on the rocker.

A further object of the invention is to provide a mode of mounting the rocker relative to the tines of the implement whereby the requisite spacing of the marginal blade is attained and at the same time a strong, stable and light-weight structure produced.

With the foregoing objects in view together with such other objects and advantages as may subsequently appear, the invention resides in the parts and in the combination, construction and arrangement of parts hereinafter described and claimed, and illustrated by way of example in the accompanying drawings, in which:

FIG. 1 is a perspective view of the implement;

FIG. 2 is an end elevation as seen in the direction of the arrow 2 in FIG. 1;

FIG. 3 is a side elevation of the weed puller showing the manner of initially engaging a plant to be pulled;

FIG. 4 is a view similar to FIG. 3 depicting the manner of utilizing the implement to loosen top soil adjacent the plant;

FIG. 5 is a view in section and plan as seen on the line 5—5 of FIG. 4 in the direction indicated by the arrows; and FIG. 6 is a view in side elevation showing the implement as disposed on completion of the weed pulling operation.

Referring to the drawings more specifically A indicates the handle of the device, which comprises the usual elongated cylindrical wooden shaft commonly employed in garden tools, and B and C designate respectively the tine and rocker element which are collectively mounted on the handle A.

In carrying out the invention a flat rectangular panel 7 sheet metal is provided, one end of which panel has the tines B integrally projecting longitudinally therefrom and the opposite end of which has an integral downturned flange 8 thereon constituting a foot rest.

The side margins of the panel 7 have integral parallel downturned flanges 9—9 the ends of which have outturned ears 10—10 thereon. The rocker C comprises an elongated strip 11 of sheet metal curved transversely which strip extends between the flanges 9—9 and is affixed to the ears 10—10 by rivets 12.

A pair of spaced axially aligned semi-cylindrical sleeves 13—13 project upwardly from the panel 7 on the longitudinal center thereof and a downwardly extending semi-cylindrical sleeve 14 projects from the underside of the panel intermediate the sleeves 13—13. The sleeves 13—13 collectively comprise a tube into which one end of the handle A projects. A screw 15 passed through the sleeve 14 engages the handle and acts to securely fasten the plate 7 with the tine, rocker and foot rest elements on the handle.

A feature of the invention resides in providing the forward edge of the rocker C with a trowel like blade D, a pair of such blades being here shown, which blades extend from the rocker plate 11 diagonally toward the tines B with the outer ends of the blades presented toward the tips of the tines in spaced relation thereto. This spacing of the blades D relative to the tines and also to the panel 7, as well as the spacing of the rocker C from the panel, is afforded by the side flanges 9—9 which in themselves are spaced apart thereby equipping the implement with a shovel area on top of the rocker between the flanges 9—9.

In the operation of the invention the handle A is grasped in the hand with the tines B presented to the ground adjacent the plant to be pulled whereupon the tines are forced into the ground by foot pressure applied to the flange 8, the tines being initially forced into the soil around the roots of the plant until the blades D—D on the forward edge of the rocker C penetrate the surface of the ground as indicated in dotted lines in FIG. 3. The handle A is then depressed with the rocker C acting as a fulcrum so as to elevate the tines B and thereby loosen the plant which action is facilitated by the trowel like action of the blades D—D in then moving upward and thereby loosening the surface soil adjacent the plant as shown in FIG. 5. Continued rocking of the implement elevates the freed plant clear of the ground as shown in FIG. 6.

In effecting removal of the plant from the ground, loosening of the soil adjacent the plant is augmented, if need be, by rocking the implement from side to side as well as up and down when positioned as indicated in dotted lines in FIG. 3. While in many instances plants may be removed by application of the implement from one side only of the plant, as shown, there are occasions where it is desirable to apply the implement at two or more points around the plant in order to adequately loosen the soil and thus insure thorough removal of root growth.

By the recited construction of the tine and rocker assemblage the parts may be struck from sheet metal and readily formed and assembled so as to be economically produced.

I claim:

A weed puller comprising a flat rectangular panel of sheet metal having integral ground penetrating tines extending longitudinally from one end thereof, an elongated wooden handle affixed to said panel and projecting from the other end thereof, a downturned flange on each of the side margins of said panel, a metal strip of arcuate cross section rigidly affixed to and connecting the lower ends of said flanges, said strip constituting a ground engaging rocker, and a pair of trowel blades projecting from said strip in the direction of said tines in spaced relation thereto.

References Cited in the file of this patent

UNITED STATES PATENTS

| 1,266,674 | Gauthier | May 21, 1918 |
| 1,857,500 | Davison | May 10, 1932 |

FOREIGN PATENTS

| 25,341 | France | Oct. 10, 1922 |